United States Patent
Geigel et al.

(10) Patent No.: US 9,959,530 B2
(45) Date of Patent: May 1, 2018

(54) METHOD AND DEVICE FOR ACCESSING, CONTROLLING AND PURCHASING A PRODUCT THROUGH A DISPENSER

(71) Applicant: SCANX, LLC, Highland Heights, OH (US)

(72) Inventors: Art Geigel, Shaker Heights, OH (US); Christopher Armenio, Aurora, OH (US); Abdullah Muhammad, Somerville, NJ (US)

(73) Assignee: SCANX, LLC, Highland Heights, OH (US)

( * ) Notice: Subject to any disclaimer, the term of this patent is extended or adjusted under 35 U.S.C. 154(b) by 0 days. days.

(21) Appl. No.: 14/959,248

(22) Filed: Dec. 4, 2015

(65) Prior Publication Data

US 2016/0086419 A1    Mar. 24, 2016

Related U.S. Application Data

(63) Continuation of application No. 13/891,211, filed on May 10, 2013, now Pat. No. 9,245,403.
(Continued)

(51) Int. Cl.
| | |
|---|---|
| *G07F 11/00* | (2006.01) |
| *G07F 9/00* | (2006.01) |
| *G06Q 20/10* | (2012.01) |
| *G07F 9/02* | (2006.01) |
| *G07F 13/02* | (2006.01) |
| *G05B 15/02* | (2006.01) |
| *G06Q 20/32* | (2012.01) |
| *G06Q 20/40* | (2012.01) |

(Continued)

(52) U.S. Cl.
CPC .......... *G06Q 20/102* (2013.01); *G05B 15/02* (2013.01); *G06Q 20/18* (2013.01); *G06Q 20/3224* (2013.01); *G06Q 20/3278* (2013.01); *G06Q 20/401* (2013.01); *G06Q 20/4014* (2013.01); *G07F 9/026* (2013.01); *G07F 11/002* (2013.01); *G07F 13/02* (2013.01); *G07F 13/025* (2013.01); *H04W 4/008* (2013.01)

(58) Field of Classification Search
CPC .............................. G07F 11/002; G07F 13/065
USPC .......................... 700/237, 241, 244; 221/96
See application file for complete search history.

(56) References Cited

U.S. PATENT DOCUMENTS

| 5,060,323 A | 10/1991 | Shaw |
| 6,394,153 B2 | 5/2002 | Skell et al. |

(Continued)

OTHER PUBLICATIONS

Flaherty, Adam, "PayPal vending machine", Retrieved at: <<http://blog.makezine.com/2010/10/27/paypal-vending-machine/>>, Make, Oct. 27, 2010, pp. 1-4.
(Continued)

*Primary Examiner* — Timothy R Waggoner
(74) *Attorney, Agent, or Firm* — Medley, Behrens & Lewis, LLC

(57) ABSTRACT

Various technologies described herein pertain to an automated dispenser including a dispensing portion, a motion sensor, a receiver module, and a control module. The control module initiates motion sensing by the motion sensor in response to receipt of an activation signal from a network server by the receiver module. The dispensing portion dispenses a product in response to the motion sensor sensing an absence, presence or motion of an object.

20 Claims, 12 Drawing Sheets

Related U.S. Application Data

(60) Provisional application No. 61/727,489, filed on Nov. 16, 2012.

(51) Int. Cl.
*H04W 4/00* (2018.01)
*G06Q 20/18* (2012.01)

(56) References Cited

U.S. PATENT DOCUMENTS

| | | | |
|---|---|---|---|
| 6,584,309 B1* | 6/2003 | Whigham | G06Q 10/087 455/407 |
| 6,705,356 B2 | 3/2004 | Barton et al. | |
| 6,799,085 B1 | 9/2004 | Crisp, III | |
| 6,801,835 B2* | 10/2004 | Covington | B67D 7/14 235/381 |
| 7,110,954 B2 | 9/2006 | Yung et al. | |
| 7,387,250 B2 | 6/2008 | Muni | |
| 7,428,987 B2* | 9/2008 | Ota | G07F 9/026 235/380 |
| 7,451,894 B2 | 11/2008 | Ophardt | |
| 7,721,958 B2 | 5/2010 | Belfer et al. | |
| 7,783,379 B2 | 8/2010 | Beane et al. | |
| 7,881,822 B2* | 2/2011 | Thornton | G07F 5/18 700/236 |
| 8,167,004 B2 | 5/2012 | Lee et al. | |
| 8,225,823 B2 | 7/2012 | Lin | |
| 8,565,916 B2 | 10/2013 | Zhang et al. | |
| 8,972,048 B2* | 3/2015 | Canora | G06Q 20/3278 700/237 |
| 9,240,007 B2* | 1/2016 | Barragan Trevino | G06Q 20/322 |
| 2002/0059148 A1 | 5/2002 | Rosenhaft et al. | |
| 2004/0089669 A1* | 5/2004 | Garratt | G07F 17/0014 221/1 |
| 2005/0059339 A1* | 3/2005 | Honda | G06K 1/12 455/3.01 |
| 2009/0065520 A1 | 3/2009 | Lee et al. | |
| 2012/0029691 A1* | 2/2012 | Mockus | G06Q 20/18 700/232 |
| 2012/0255969 A1 | 10/2012 | Lin | |
| 2012/0267432 A1 | 10/2012 | Kuttuva | |
| 2014/0142748 A1 | 5/2014 | Geigel et al. | |

OTHER PUBLICATIONS

"Pour My Beer", Retrieved at: <<http://pourmybeer.com/>>, Retrieval Date: Feb. 3, 2013, pp. 1-5.

"Beer Wall", Retrieved at: <<http://www.ellicksonusa.com/beer-wall.php>>, Retrieval Date: Feb. 3, 2013, pp. 1-3.

Falconer, Jason, "The Social Drink Machine takes your order via Facebook and Twitter", Retrieved at: <<http://www.gizmag.com/social-drink-machine-order-via-facebook/25033/>>, Retrieval Date: Nov. 16, 2012, pp. 1-4.

Eaton, Kit, "If You Like Delicious Coffee, You Are Going to Looooove the Internet of Things", Retrieved at: <<http://www.fastcompany.com/3003584/if-you-love-delicious-coffee-you-are-going-to-looooove-internet-things>>, Fast Company, Dec. 4, 2012, pp. 1-10.

"Non-Final Office Action for U.S. Appl. No. 13/891,211", dated Mar. 19, 2015, 7 pages.

"Response to the Non-Final Office Action for U.S. Appl. No. 13/891,211", Filed Dated Jun. 19, 2015, 13 pages.

"Final Office Action for U.S. Appl. No. 13/891,211", dated Aug. 20, 2015, 8 pages.

"Response to the Final Office Action for U.S. Appl. No. 13/891,211", Filed Dated Aug. 20, 2015, 8 pages.

"Notice of Allowance and Fees Due for U.S. Appl. No. 13/891,211", dated Sep. 8, 2015, 5 pages.

* cited by examiner

METHOD AND DEVICE FOR ACCESSING, CONTROLLING AND PURCHASING A PRODUCT THROUGH A DISPENSER

CROSS REFERENCE TO RELATED APPLICATION

This application is a continuation of U.S. patent application Ser. No. 13/891,211, filed on May 10, 2013, and entitled "METHOD AND DEVICE FOR ACCESSING, CONTROLLING AND PURCHASING A PRODUCT THROUGH A DISPENSER", which claims priority to U.S. Provisional Patent Application No. 61/727,489, filed on Nov. 16, 2012, and entitled "METHOD AND DEVICE FOR ACCESSING, CONTROLLING AND PURCHASING VARIOUS FLUIDS THROUGH A NETWORK CONNECTED DISPENSER", the entireties of which are incorporated herein by reference.

BACKGROUND

Vending machines can include goods for dispensing, and commonly are located in public and at establishments. Further, vending machines offer quick and easy access to vending goods without the need for the retail establishment to pay an employee to personally complete the transaction. Vending machines also provide goods to consumer in a timely manner, compared to waiting in a check-out line in a grocery store or waiting to be served a drink at a bar, for example.

Some vending machines dispense fluids, such as coffee or tea, into disposable cups for consumers. Consumers place cash inside a receptacle of the vending machine to pay for the consumer's desired drink and initiate dispensing of the drink.

Beer is typically supplied in kegs that are pressurized using an external pressure source, such as a cylinder of carbon dioxide or nitrogen. A tube may be connected to an output of a beer keg for distributing beer through a beer tap (i.e., a valve at the output of the tube). Traditionally, a beer tap has a lever that is manually operated by a bartender to dispense beer through the tap.

SUMMARY

Described herein are various technologies that pertain to a dispenser capable of dispensing in response to detection of presence or motion of an object. The automated dispenser comprises a dispensing portion, a motion sensor, and a receiver module. According to various embodiments set forth herein, the receiver module receives an activation signal from a network to indicate authorization of dispensing of a product by the dispensing portion. The automated dispenser further comprises a control module that initiates sensing by the motion sensor in response to the receiver module receiving the activation signal. The automated dispenser is associated with an identifier, wherein the identifier is configured to be scanned by a mobile device for purchase of the product. The network server sends the activation signal to the receiver module in response to receipt of a request signal that is sent by the mobile device that includes the information associated with the identifier.

The dispensing portion dispenses the product in response to the motion sensor detecting a presence or motion of an object. The motion sensor may be an infrared sensor, a camera, or any other means of motion detection. The motion sensor detects a user's motion and transmits data generated from the user's motion to the control module, wherein the control module analyzes the data generated by the motion sensor and dispenses the product based thereon. The automated dispenser may dispense fluids or solids. The automated dispenser may dispense a predetermined amount of liquid at a predetermined rate, or the dispensing rate may be a function of the detected distance of an object relative to the automated dispenser. The automated fluid dispenser further has an indicator/indicators that is/are configured to indicate a state of the automated fluid dispenser. The states of the automated fluid dispenser can be at least one of the following: a ready to be scanned state, a ready to dispense state, and a dispensing state.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
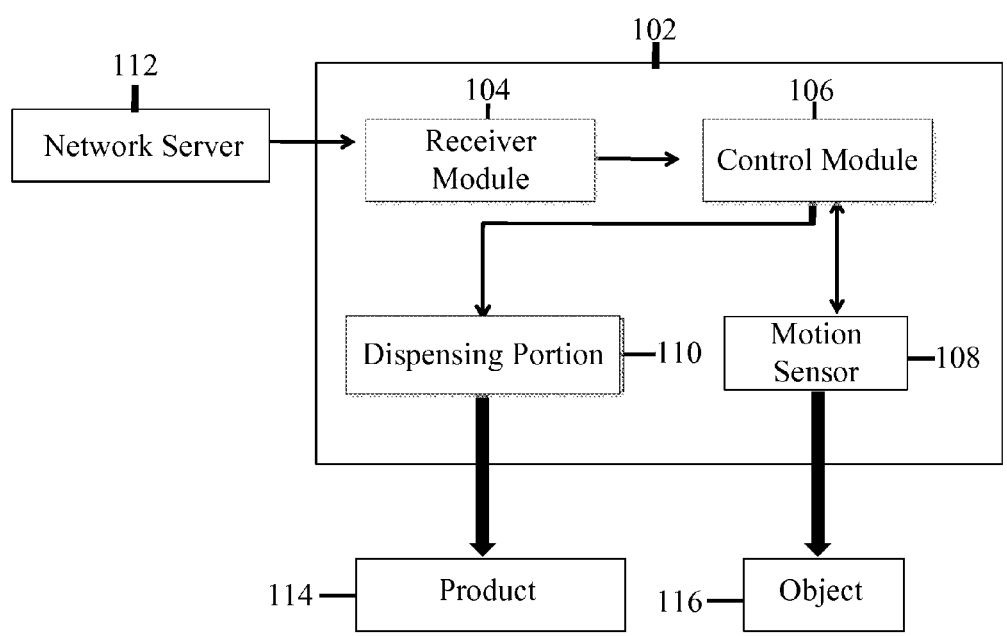
FIG. 1 illustrates a block diagram of an exemplary automated dispenser.

Various technologies pertaining to automated dispensers are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

An automated dispenser that is configured to dispense a product in response to a signal from a motion sensor, where the motion sensor can detect the absence, presence, or motion of an object, is set forth herein. The motion sensor may be activated by an activation signal received from a network server, wherein the signal indicates that the automated dispenser is authorized to dispense. Additionally, the motion sensor may be configured to detect objects or hand gestures as a dispensing motion.

Referring now to the drawings, FIG. 1 illustrates a block diagram of an exemplary automated dispenser 102. The automated dispenser 102 can receive an activation signal. Upon receipt of the activation signal, the automated dispenser 102 can dispense a product 114 in response to an object 116 detected by the automated dispenser 102.

The automated dispenser 102 includes a receiver module 104 that receives the activation signal from a network server 112. The activation signal may indicate authorization to dispense, authorization of a payment request, receipt of payment, redemption of a voucher, redemption of a coupon, authorization of a free sample, or a request to dispense. The activation signal may originate from any number of sources including a mobile device, the network server 112, or a local network device. The mobile device may create the activation signal and communicate the activation signal directly to the automated dispenser 102. Alternatively, the mobile device may communicate the activation signal to a network server 112 or a local network device, either of which can relay the activation signal to the automated dispenser 102. In another example, either the network server 112 or the local network device can create the activation signal and either directly or indirectly communicate the activation signal to the automated dispenser 102. In some examples, the activation signal is sent in response to the network server 112 processing a payment for the product 114.

In some examples, the network server 112 sends the activation signal to the receiver module 104 in response to receipt of a request signal that is sent by a mobile device. The mobile device can create a request signal that indicates a request for the automated dispenser 102 to dispense. The network server 112 or local network device can receive the request signal and communicate the request signal to the receiver module 104. Alternatively, the receiver module 104 can receive the request signal directly from the mobile device.

The automated dispenser 102 further includes a control module 106. The control module 106 may be a single module, a processor, a combination of modules, a combination of processors. The control module 106 may communicate with and control other modules and components of the automated dispenser 102. For example, the receiver module 104 communicates the activation signal to the control module 106. The receiver module 104 may communicate the same activation signal received by the receiver module 104, or may communicate a distinct signal.

The automated dispenser 102 further includes a motion sensor 108. The control module 106 activates the motion sensor 108. The motion sensor 108 may be an infrared sensor, a camera, a RF field sensor, radar, an ultrasonic sensor, a video sensor, or a proximity sensor. The control module 106 may activate the motion sensor 108 in response to the activation signal communicated by the receiver module 104.

The motion sensor 108 is configured to detect whether the object 116 is present within range of the motion sensor 108. The motion sensor 108 may be configured to detect objects within proximity to the motion sensor 108 (e.g., within 10 feet, 5 feet, 3 feet, 0.5 feet). The motion sensor 108 communicates data generated from the user's motion, or the motion or presence of the detected object 116 to the control module 106. The motion sensor data may include information about the detected object 116 including motion, presence, absence of the object 116 within range of the motion sensor 108, or other properties of the object 116. Motion of the object 116 can include a dispensing motion. A dispensing motion includes moving the object 116 up and down relative to the motion sensor 108, moving the object 116 side to side relative to the motion sensor 108, rotating the object 116 relative to the motion sensor 108, or modifying the shape of the object 116. The motion sensor 108 may be limited to detecting the object 116 within a spatial boundary (i.e., range). When the object 116 is not within the spatial boundary the motion sensor 108 may communicate the absence of the object 116 to the control module 106. Other properties of the object 116 may include shape, size, temperature, color, or any other measurable property of the object 116.

Further, the control module 106 may initiate actions performed by a dispensing portion 110 based on the motion sensor 108 data. The motion sensor 108 may detect motion of the object 116 and transmit data generated from the motion of the object 116 to the control module 106, wherein the control module analyzes the data generated by the motion sensor 108 and dispenses the product 114 based thereon. The dispensing portion 110 may be a fluid outlet, fluid tap, fluid valve, a dispenser mechanism of a vending machine, a claw of a Claw Crane game, or any other mechanism that dispenses. Such actions performed by the dispensing portion 110 may include: dispensing, changing a dispensing option, doing nothing, stopping dispensing, or dispensing a different object. The dispensing portion 110 may dispense the product 114 in response to the motion sensor data. The product 114 may be a fluid, such as beer, wine, soda, etc., or a solid, such as any typical vending machine item or other product.

Figure 2:
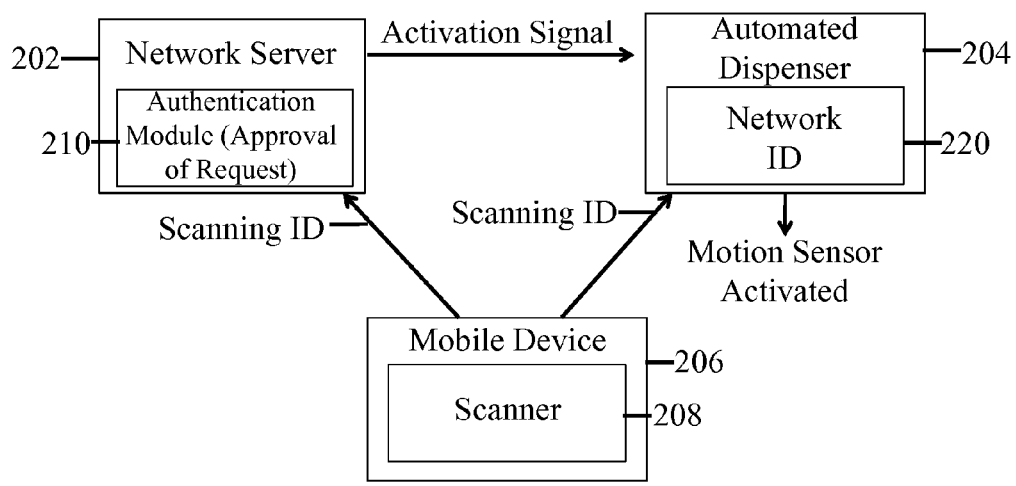
FIG. 2 illustrates a schematic diagram of an exemplary automated dispenser system.

FIG. 2 illustrates a schematic diagram of an exemplary automated dispenser system. A network server 202 is in communication with an automated dispenser 102 and a mobile device 206. The communication may be through the internet, a wireless communication pathway, a wired communication pathway, near-field communication, or any other method of communication. The mobile device 206 may be a smart phone, tablet computer, portable gaming device, handheld computing device, or any other portable electronic device.

The network server 202 includes an authentication module 210 that can approve requests from the mobile device 206 to activate the automated dispenser 102. The automated dispenser 102 includes an identifier 220 that is detectable by the mobile device 206. The automated dispenser 102 is associated with the identifier 220, wherein the identifier 220 is configured to be scanned by a mobile device 206 for purchase of the product. For example, the identifier 220 may be visually displayed on or near the automated dispenser 102. Alternatively, the identifier 220 may be communicated through near-field-communication ("NFC"). In another example, the identifier 220 may be communicated using auditory sounds or other signals that may be understood by a human or the mobile device 206. The mobile device 206 may include a scanner, such as optical, NFC, or other device that is able to detect the identifier 220 of the automated dispenser 102. The mobile device 206 can scan the identifier 220 to communicate the identification information generated by the identifier 220 in a request to the network server 202 to purchase a product.

The request can be a dispensing request, a purchasing request, or a combination thereof. For example, the request may be for dispensing of a free sample. In another example, the request may be for a purchase of 8 ounces of beer. In turn, the authentication module of the network server 202 either approves or rejects the request. Upon approval, the network server 202 communicates an activation signal to the automated dispenser 102, which then activates a motion sensor included with the automated dispenser 102 as described herein. Upon activation of the motion sensor, the motion sensor may detect the object 116 (FIG. 1) to initiate dispensing of the product 114 (FIG. 1).

Figure 3:
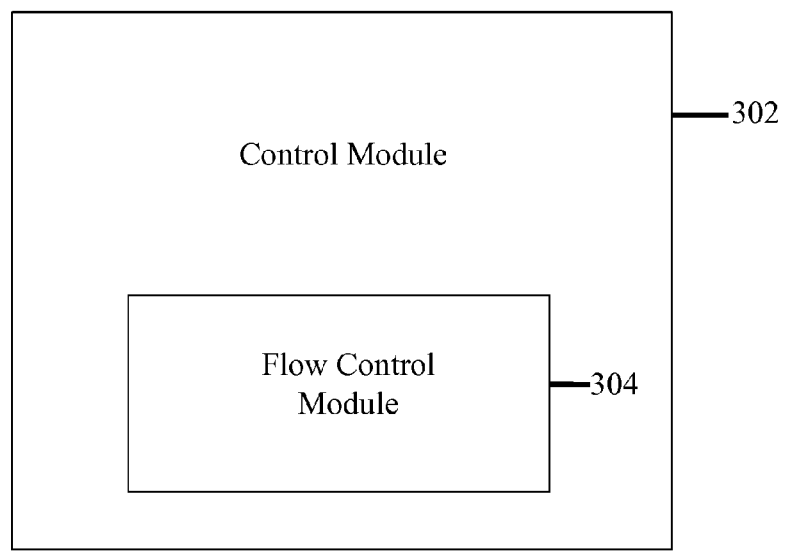
FIG. 3 illustrates an exemplary control module of an automated dispenser.

FIG. 3 illustrates an exemplary control module 302 of an automated dispenser. The control module 302 may include a flow control module 304 that modulates a fluid dispensing rate of the product 114 (FIG. 1) or a predetermined amount of product 114 to be dispensed by the dispensing portion 110. When dispensing a fluid such as beer, the flow control module 304 may alternate the rate of volume flow of the beer between zero and a predetermined rate. For example, the dispensing portion 110 may either dispense the product 114 at a constant rate or not at all. The flow control module may communicate with the dispensing portion 110 to increase, decrease, or maintain the rate of volume flow of the beer.

A fluid dispensing rate of the dispensing portion 110 may be a function of presence or the motion of the object 116 that is sensed by the motion sensor 108. When dispensing a fluid such as wine or oxygen, the flow control module 304 may alter the rate of flow gradually. For example, the rate of dispensing may be proportionate to the proximity of the object 116 to the motion sensor 108.

Further, the flow control module 304 may instruct the dispensing portion 110 to dispense a predetermined amount of the product 114 as a function of the detected distance of an object relative to the automated dispenser. For example, the flow control module 304 may instruct the dispensing portion 110 to dispense two candy bars when the motion sensor 108 detects the object 116. In another example, the flow control module 304 may instruct the dispensing portion 110 to dispense 8.0 ounces of beer when the motion sensor 108 detects the object 116 within two feet of the motion sensor 108. In a further example, the flow control module 304 may instruct the dispensing portion 110 to dispense up to 8.0 ounces of beer when the motion sensor 108 detects the object 116 is moving downward.

Figure 4:
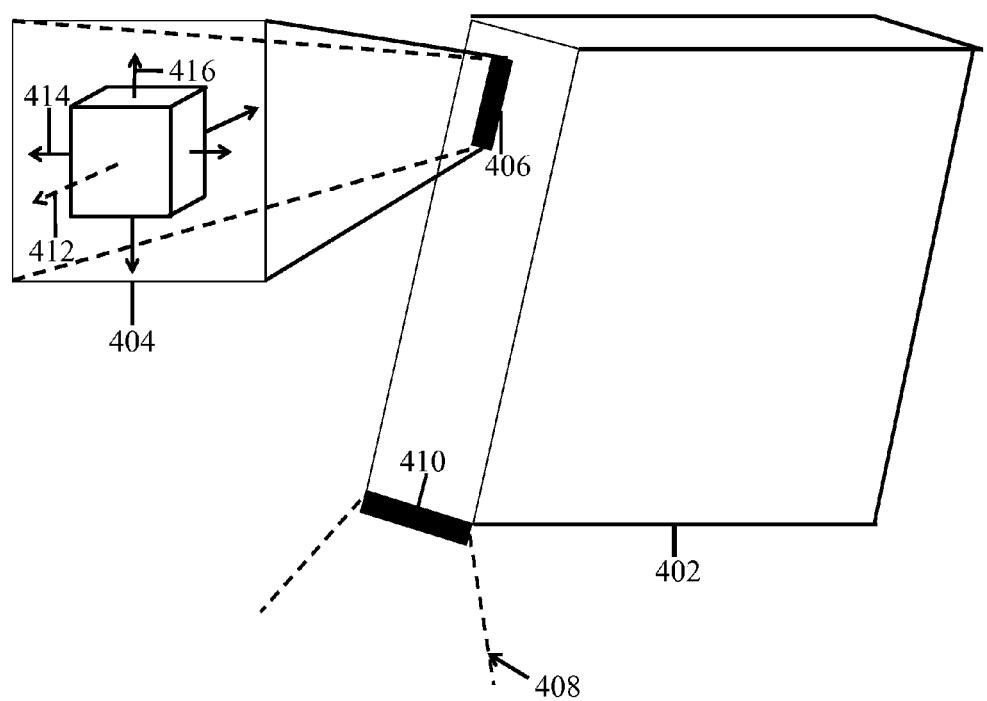
FIG. 4 illustrates a perspective view of an exemplary automated dispenser.

FIG. 4 illustrates a perspective view of an exemplary automated dispenser 402. The automated dispenser 402 includes a motion sensor 406 with a corresponding sensing zone 404, and a dispensing portion 410 with a corresponding dispensing zone 408. The dispensing zone of the automated dispenser may be below the dispensing portion 410, allowing gravity to assist the dispensing portion 410 in dispensing the product 114 into the dispensing zone 408. The motion sensor 406 may be configured to cause the dispensing portion to dispense product in response to the presence or motion of an object within the sensing zone 404. The motion sensor 406 may detect the object 116 and subsequently instruct the dispensing portion 410 to dispense the product 114. The motion sensor 406 may be activated responsive to receipt of an activation signal that indicates authorization of a dispense request. The dispense request may be a communication that indicates a request to purchase, a request to redeem a voucher, a request to redeem a coupon, a request for a free sample. The dispense request may be communicated from the mobile device 206, a user, or local network device. The dispense request may be communicated to the receiver module 104 or to the network server 112. Upon receipt of the dispense request the network server 112 may elect to either authorize or deny the dispense request. If the network server 112 authorizes the dispense request the network server may communicate such authorization in the activation signal sent to the receiver module 104.

A network server may instruct the motion sensor 406 to activate to detect the object 116 within the sensing zone 404. The motion sensor 406 may detect a presence or a motion of the object 116 within the sensing zone 404. The sensing zone 404 may originate at the motion sensor 406 and extend outwardly from the motion sensor 406. A plane of the sensing zone 404 may be perpendicular to a Z-axis 412 of the sensing zone 404 that originates at the motion sensor 406 and extends through a central portion of the sensing zone 404. The plane of detection may be parallel to a X-axis 414 and Y-axis 416 of the sensing zone 404. The motion sensor 406 may detect motion of the object 116 (FIG. 1) that is along any one of the X-axis 414, Y-axis 416, or Z-axis 412. In some examples, the motion detected by the motion sensor includes a component parallel to a plane of detection, i.e., along the X-axis 414, of the motion sensor relative to the automated fluid dispenser.

The motion sensor 406 may detect the object 116 and the corresponding movement of the object 116 in any direction within the sensing zone 404. Upon detection of the object 116, the dispensing portion 410 may dispense the product 114 (FIG. 1) into the dispensing zone 408. The dispensing zone 408 originates at the dispensing portion 408 and extends around the space that the product 114 is dispensed into. In some examples the dispensing zone 408 and the sensing zone 404 will not overlap, and the dispensing zone 408 may be below the sensing zone 404. For example, the motion sensor 406 may detect the object 116 within the sensing zone 404, and the object 116 will not be within the dispensing zone 408, which is at the opposite end of the automated dispenser 402 below the sensing zone 404 and the dispensing portion 410. In other examples, the dispensing zone 408 and the sensing zone 404 will at least partially overlap one another. For example, the motion sensor 406 may detect the object 116 within the sensing zone 404, and the object 116 will be at least partially within the dispensing zone 408.

Figure 5:
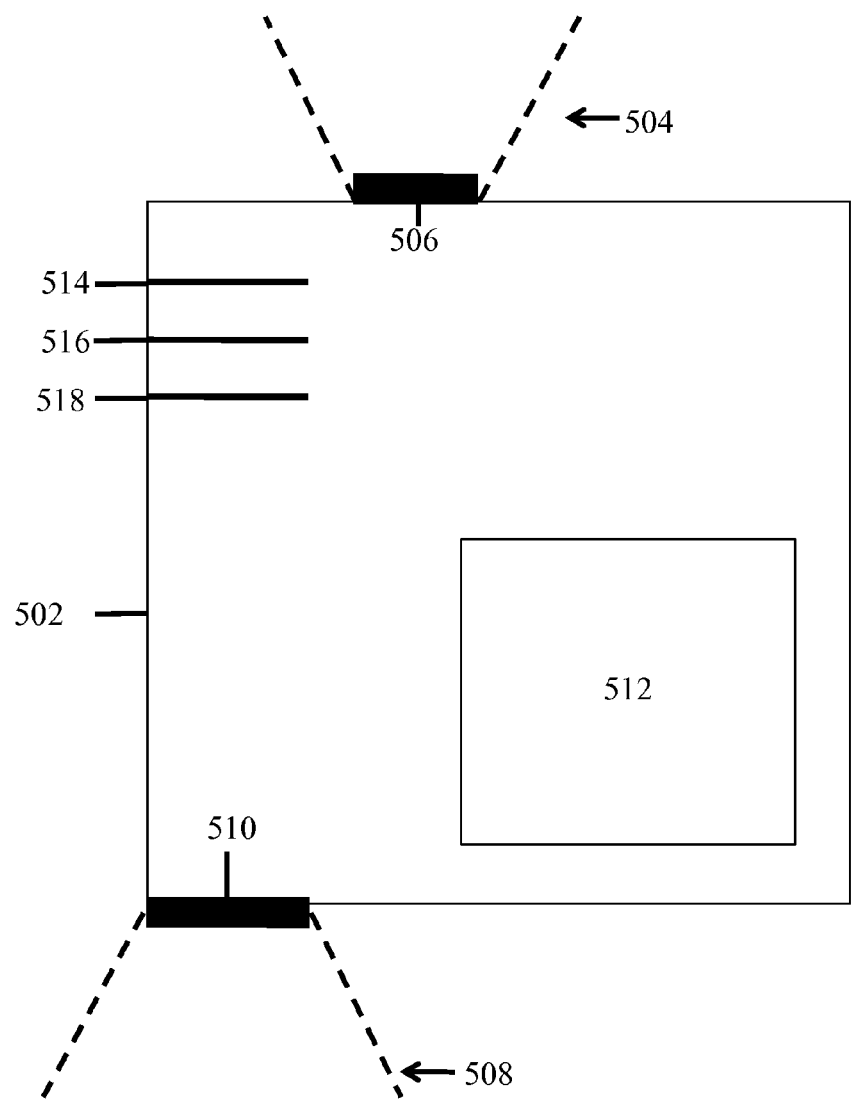
FIG. 5 illustrates a schematic side view of an exemplary automated dispenser.

FIG. 5 illustrates a schematic side view of an exemplary automated dispenser 502. The automated dispenser 502 includes a motion sensor 506 that detects presence or motion of an object within a sensing zone 504, and a dispensing portion that dispenses product 114 into a dispensing zone 508. The automated dispenser 502 can include an access port 512. Internal components of the automated dispenser 502 can be accessed via the access port 512. In some examples, the sensing zone 504 of the automated dispenser 502 is spatially apart from the dispensing zone 508.

The automated dispenser 502 may include an indicator 514, an indicator 516, and an indicator 518 ("indicators 514-518" collectively). The indicators 514-518 may be lights that are configured to indicate the current status or operation of the automated dispenser 502. The automated dispenser 502 may be in a ready to be scanned state, a ready to dispense state, and a dispensing state. For example, indicators 514-518 may be configured to light up a color, combination of colors, or be off when the automated dispenser 502 is in a ready to be scanned state (e.g., the automated dispenser 502 is off, the motion sensor 506 is off, and/or the dispensing portion 510 is not currently dispensing). The indicators 514-518 may light up a different color or combination of colors to indicate that the automated dispenser 502 is in a ready to dispense state (e.g., the motion sensor 506 is activated and responsive to detection of the object 116). The indicators 514-518 may light up a still different color or combination of colors to indicate the automated dispenser 502 is in a dispensing state (e.g., when the dispensing portion 510 is dispensing product 114).

In some examples the indicator 514 may light up in a color (e.g., green) when the motion sensor 506 is activated to detect motion of the object 116 (FIG. 1) to initiate dispensing. In other examples, multiple indicators (e.g., two or more of the indicators 514-518) may light up in a green color to indicate that the dispensing portion 510 is dispensing the product 114 (FIG. 1) when the automated dispenser 502 is in the dispensing state. In other examples of the dispensing state, the indicator 514 may transition from one color to another to indicate the amount of product 114 remaining to be dispensed. For example, the indicator 514 may light up red at first, transition to a blue color half-way through dispensing the product 114, and transition to a violet color when finished dispensing product 114.

While three indicators are depicted, it is contemplated that the automated dispenser can include fewer than three or more than three indicators according to various embodiments. The indicator 514 may change color depending on the current operating state of the automated dispenser 502. For example, the indicator 514 may be red when the motion sensor 506 is deactivated.

Figure 6:
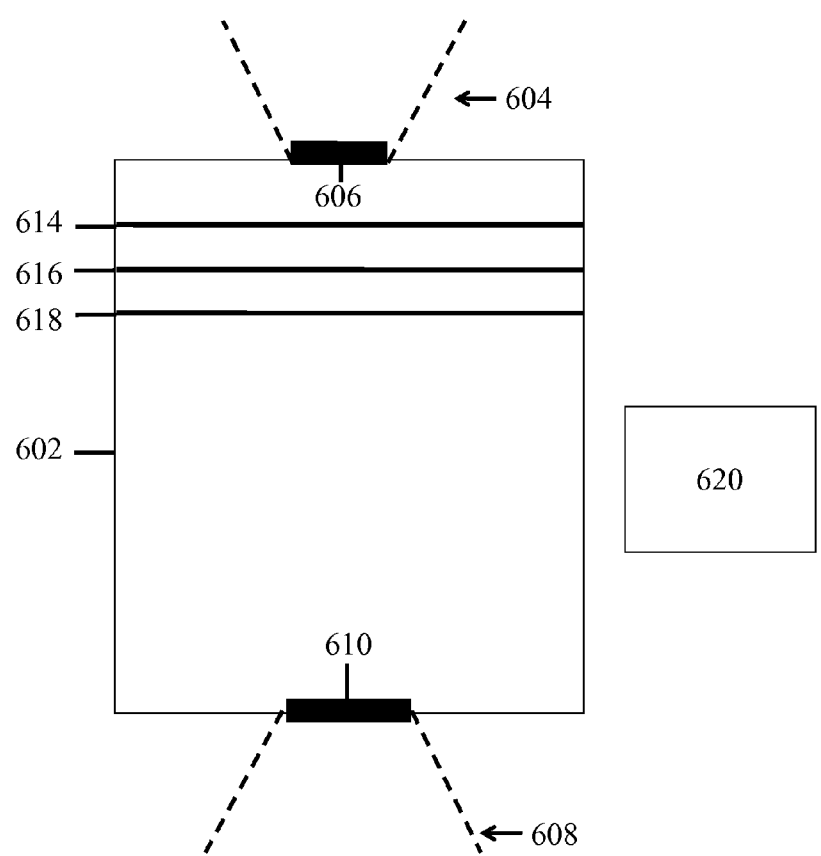
FIG. 6 illustrates a schematic front view of an exemplary automated dispenser that dispenses liquid.

FIG. 6 illustrates a schematic front view of an exemplary automated dispenser 602 that dispenses liquid. The automated dispenser 602 includes a motion sensor 606. The motion sensor 606 is capable of detecting the object 116 when the object 116 is within a sensing zone 604. The sensing zone 604 may be proximate (e.g., within 10 feet, 5 feet, 3 feet, or 0.5 feet) to the motion sensor 606. According to the example depicted in FIG. 6, the automated dispenser 602, includes three indicators, an indicator 614, an indicator 616, and an indicator 618 ("indicators 614-618" collectively), which may be a light source. The automated dispenser 602 may include one indicator, for example just indictor 614, or two indicators, for example indicator 614 and indicator 616. The indicators 614-618 may be configured to signify that the automated dispenser is in various states. Wherein the automated dispenser states include a ready to be scanned state, a ready to dispense state, and a dispensing state. For example, the indicators 614-618 may signify deactivation of the dispensing portion 610, which may indicate a ready to be scanned state. The indicators may indicate motion sensor activation 606, which may indicate a ready to dispense state. The indicators may further indicate that the automated dispenser 602 is dispensing, which may indicate the dispensing state 602. The indicators 614-618 may also signal an amount of liquid left to pour, or already poured by the number of indicators that are alight. While three indicators 614-618 are depicted, in various embodiments there can be zero, one, or two indicators, or more than three indicators, each of which can be substantially similar to the indicators 614-618 described herein. When the motion sensor 606 is activated, the indicators 614-618 may light up, flash, change color, perform some other display, or perform some other perceivable notification. For instance, in various embodiment it was completed that the automated dispenser 602 can include a speaker to indicate activation, wherein a sound is output independently or in conjunction with indicators 614-618.

The motion sensor 606 may be an infrared sensor, a camera, or some other means of motion detection. The motion detector 606 senses motion in the sensing zone 604. For example, an infrared sensor is capable of detecting a hand 3 feet away from the infrared sensor. Once the motion sensor 606 is activated, and has detected the motion or presence of the object 116, wherein the object 116 may be a hand, arm, or any other object that is detectable by the motion sensor 606, the motion sensor 606 activates the dispensing portion 610. The dispensing portion 610 dispenses a fluid into the dispensing zone 608. The fluid dispensed can be soda, water, beer, wine, juice, oxygen, or any other potable fluid.

Moreover, the automated dispenser 602 can have an associated identifier 620. The identifier 620 can be a QR code, barcode, magnetically readable chip, near-field communication chip, visual display, or any other apparatus able to provide identification information. The identifier is configured such that a mobile device can scan or otherwise evaluate the identifier.

Figure 7:
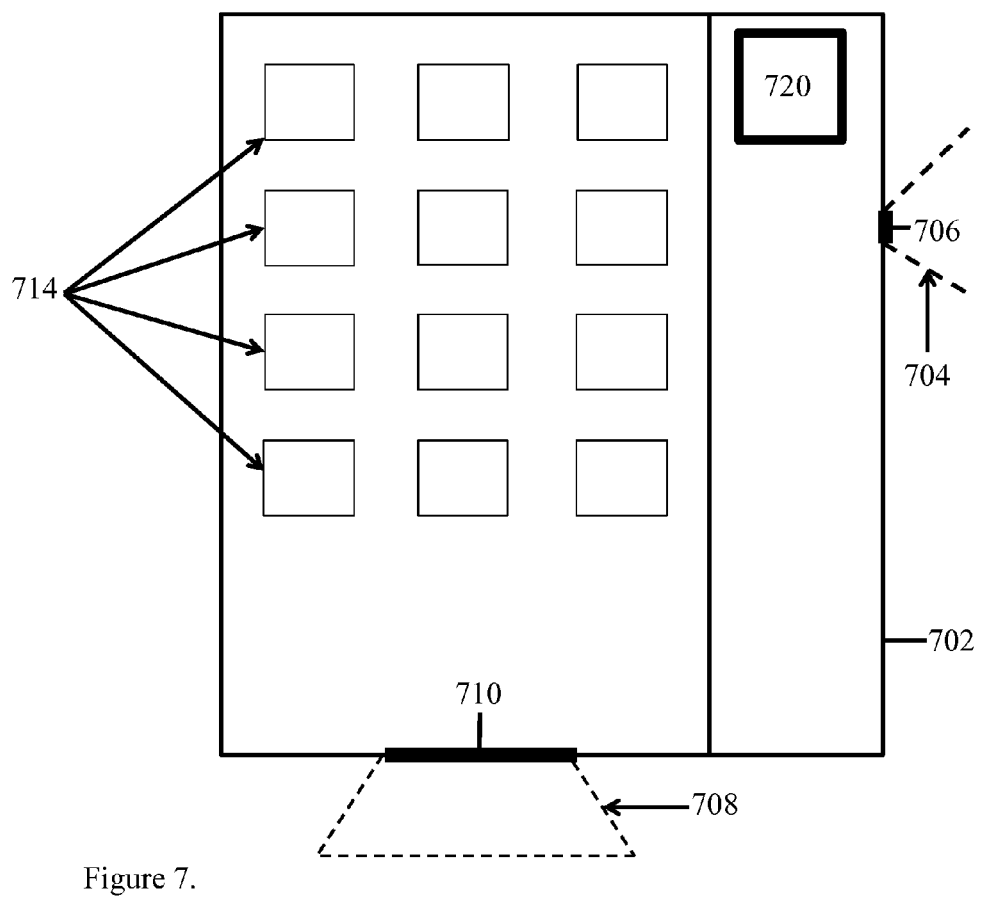
FIG. 7 is an illustration of a front view of an exemplary automated dispenser that dispenses a non-liquid product (e.g., a solid product).

FIG. 7 is an illustration of a front view of an automated dispenser 702 that dispenses a non-liquid product (e.g., a solid product). The automated dispenser 702 includes a motion sensor 706 that is activated by an activation signal. The activation signal may be sent in response to a mobile device request that includes a scan of the identifier 720, which the mobile device scans. The motion sensor 706 may be an infrared sensor, a camera, or some other device that can sense motion and/or detect the presence or motion of the object 116 (FIG. 1). The object 116 the motion sensor 706 detects may be a hand, arm, limb, or some other object that is detectable by the motion sensor. The motion sensor 706 detects the presence or motion of the object 116 in the sensing zone 704. Once the motion sensor 706 is activated, the product 714 may be selected. The motion sensor 706 may sense the object 116 or a property of the object (e.g., movement or gesture of a hand) to select the product 714 to be dispensed. The product 714 may then be dispensed through the dispensing portion 710, and into the dispensing zone 708. The product 714 may be: individually wrapped snacks, such as candy, bottled drinks, hygiene products, prophylactics, alcohol, cigarettes, or any other object that may be dispensed.

Figure 8A:
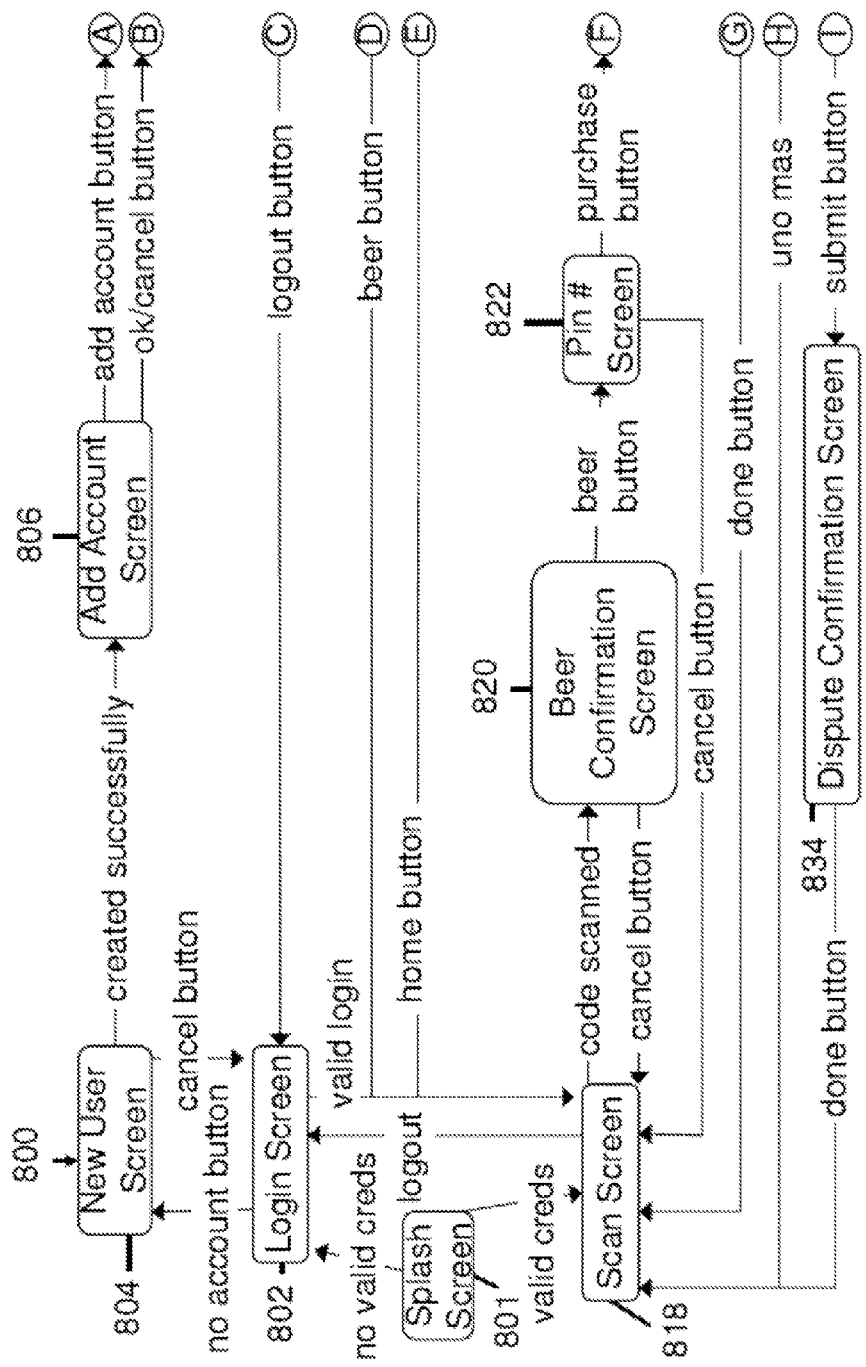
FIGS. 8A and 8B illustrate a schematic diagram of the operation of an automated dispenser.
Figure 8B:
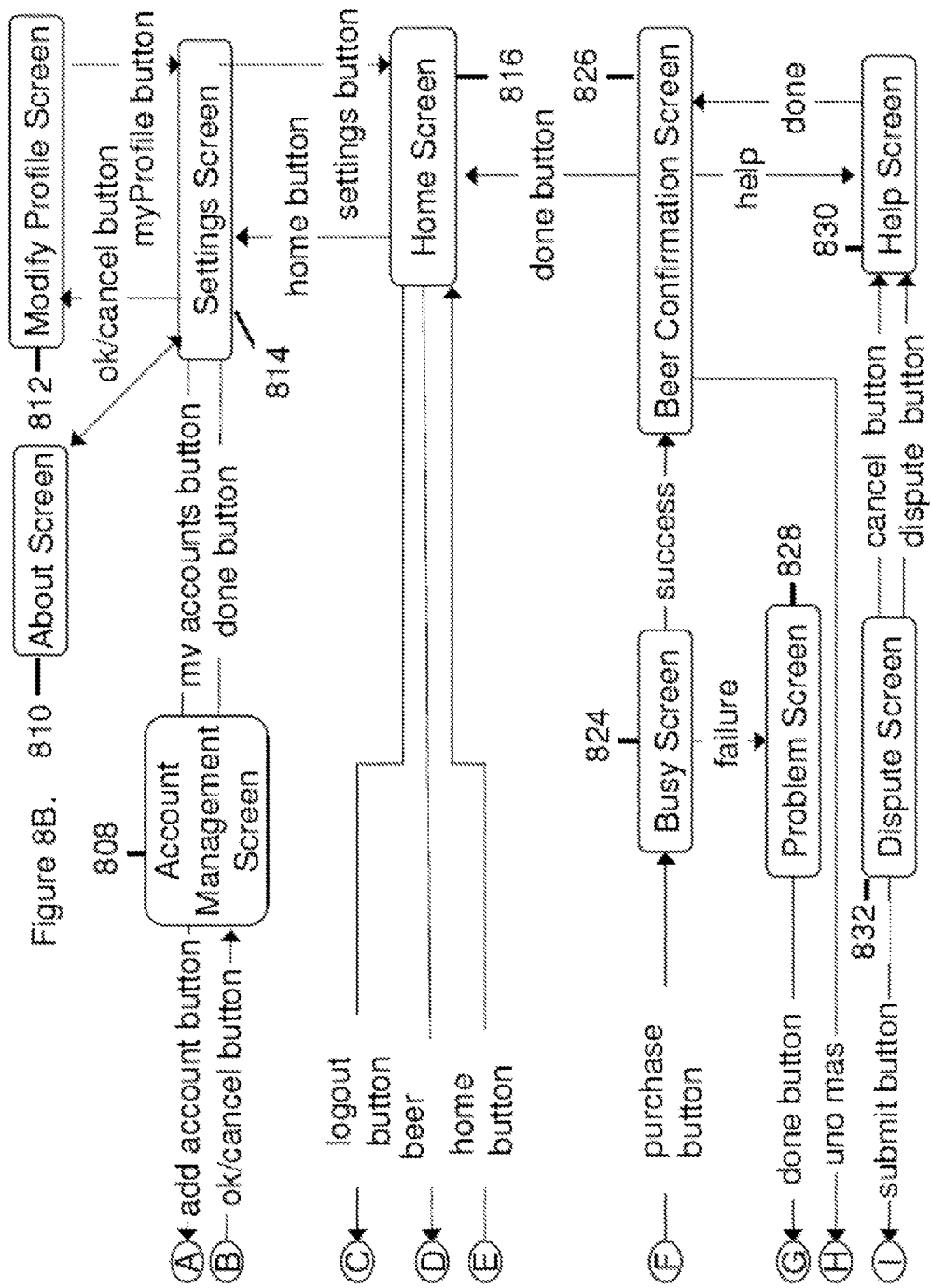

FIGS. 8A and 8B illustrate a schematic diagram of the operation of an automated dispenser using a mobile device. The mobile device can execute an automated dispenser application (the "application") 800. The application 800 can initially cause a Splash screen 801 to be displayed on a display screen of the mobile device. Thereafter, the application 800 can cause a Login Screen 802 to be displayed on the display screen, which can prompt a user to enter credentials. If no valid credentials are found, the application 800 can prompt the user to indicate whether the user has an account or not. If no login credentials are entered, the application 800 can cause a New User Screen 804 to be displayed on the display screen. The application 800 can cause the creation of an account based on user input. The application 800 can cause an Add Account Screen 806 to be displayed. If the user selects an Add Account Screen 806, the application 800 can cause to an Account Management Screen 808 to be displayed on the display screen. The application 800 can cause the display screen to revert to the Add Account Screen 806 responsive to the user selection of an account button. From the Account Management Screen 808, the application 800 can cause a Setting Screen 814 to be displayed in response to the user selection of a done button. The application 800 can cause the display to revert to the Account Management Screen 808 responsive to the user selection of a my accounts button. From the Setting Screen 814, the application 800 can cause an About Screen 810 to be displayed. The application 800 may be caused to display a Modify Profile Screen 812 on the display screen in response to the user selection of a my Profile button. The application 800 may be caused to display the Setting Screen 814 on the display screen in response to the user selection of cancel or okay. Once the application 800 has registered the creation of an account, the application can cause a Home Screen 816 to be displayed. From the Home Screen 816, the application 800 can cause the display of a Scan Screen 818 responsive to the user selection of the beer button, or the application 800 can cause the display of the Login Screen 802 in response to the user selection of the logout button. Further, from the Home Screen the application 800 can be caused to display the Settings Screen 814 responsive to the user selection of the settings button.

The application 800 can cause the Scan Screen 818 to be displayed through three different user actions: 1) the user can create an account as described above, 2) when the application 800 finds that the user has no credits available but has found a valid login, or 3) when the application 800 finds that the user has valid credits. From the Scan Screen 818, the identifier/code (herein code and identifier are synonymous) that is associated with the automated dispenser may be scanned or input. The mobile device sending the code (e.g., 1, 101, or 9999999) to a network server can cause the application 800 to display a Beer Confirmation Screen 820. The application 800 may be caused to display the Scan Screen 818 responsive to the user selection of the cancel button. Alternately, the application 800 may be caused to display a Pin # Screen 822 responsive to the user selection of the beer button. The application 800 may be caused to display a Buy Screen 824 responsive to the user selection of a purchase button, or the application 800 may be caused to display the Scan Screen 818 responsive to the user selection of cancel. From the Buy Screen 824, the application 800 may receive a success message, which may cause the application 800 to display the Beer Confirmation Screen 826, or if the application 800 receives a failure notice, the application 800 may display a Problem Screen 828. From the Problem Screen 828, the application 800 may be caused to display the Scan Screen 818 responsive to the user selection of the done button. From the Beer Confirmation Screen 826, the used may select Uno Mas, which will send a signal to the automated dispenser, via a network server, to dispense fluid.

From the Beer Confirmation Screen 826, the application 800 may be caused to display the Help Screen 830 responsive to the user selection of the help button. The application 800 may be caused to display the Beer Confirmation Screen 826 responsive to he user selection of done. The application 800 may be caused to display a Dispute Screen 832 responsive to the user selection of a dispute button. The application 800 may be caused to display the Help Screen 830 responsive to user selection of the cancel button, or the application 800 may be caused to display a Dispute Conformation Screen 834 responsive to the user selection of a submit button. From the Dispute Confirmation Screen 834, the user may select the done button, which may cause the application 800 to display the Scan Screen 818.

Figure 9:
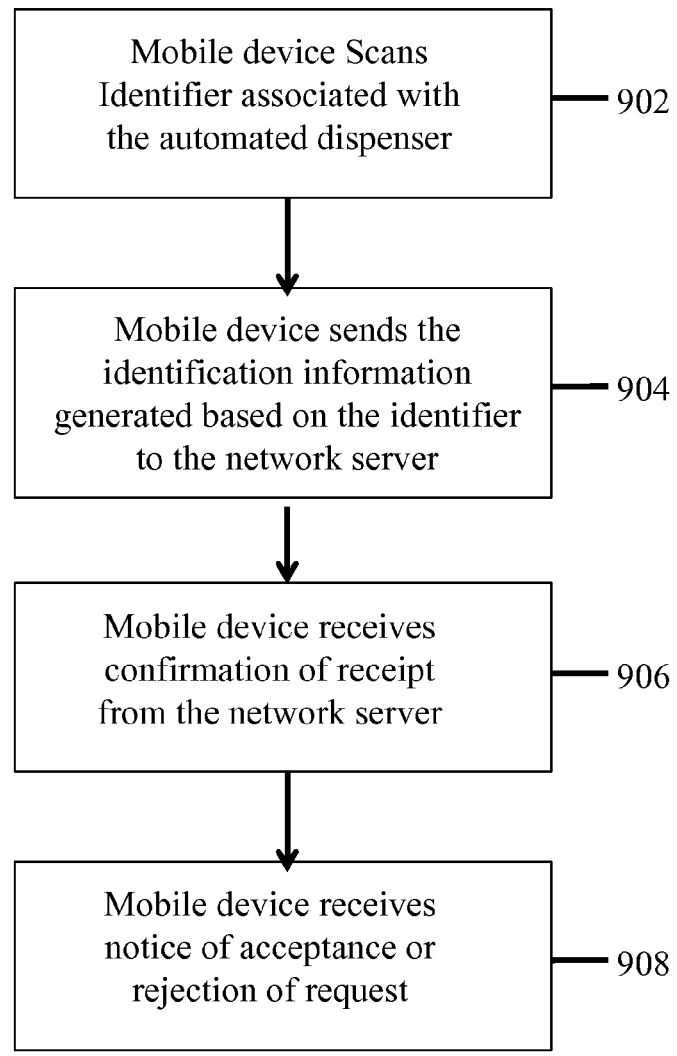
FIG. 9 is a diagram illustrating an exemplary method of employing a mobile device to cause a fluid to be dispensed from an automated fluid dispenser.

FIG. 9 is a diagram illustrating a method of employing a mobile device to cause a fluid to be dispensed from an automated fluid dispenser. At 902, the mobile device first scans the identifier that is associated with the automated fluid dispenser. The mobile device may scan the identifier using a camera function. Further, the mobile device may identify the identifier using near field communication, detecting a physical tap from the mobile device, through proximity determined through GPS, or any other method of scanning or identifying the identifier. The mobile device generates identification information generated from the identifier then sends the identification information to a network server. At 904, the identification information generated from the identifier may be sent to the network server via a wifi network, a cellular network, or any other method of data transmission that is available. At 906, the mobile device then receives a confirmation of receipt from the network server also via a wifi network, cellular network, or any other method of data transmission that is available. At 908, the mobile device also receives either a notice of allowance or rejection from the network server, wherein an allowance means the automated dispenser will be activated to dispense fluid, and a rejection means the automated dispenser will not.

Figure 10:
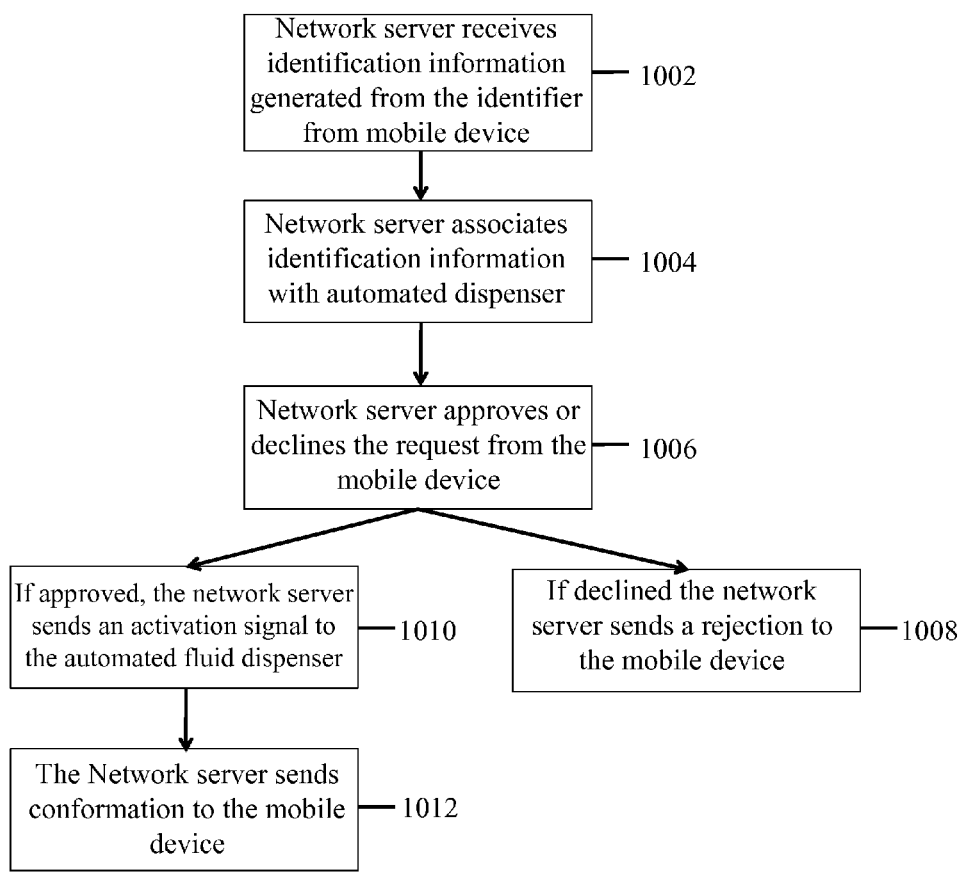
FIG. 10 is a diagram illustrating an exemplary method of employing a network server to cause a fluid to be dispensed from an automated fluid dispenser.

FIG. 10 is a diagram illustrating the method of employing a network server to cause a fluid to be dispensed from an automated fluid dispenser. At 1002, the network server receives a signal from a mobile device. The signal from the mobile device includes identification information generated from the identifier that is associated with the automated dispenser; the signal constitutes a request to activate the automated dispenser. At 1004, the network server associates the identification information with the automated dispenser. Thus, for example the network server can recognize the identity of the automated fluid dispenser based on the identification information. At 1006, the network server either approves or denies the request to activate the automated dispenser. The network server approves the request based on predetermined requirements, such as the user having credits already applied to an account to pay for the product, the user being preapproved by the automated fluid dispenser's owner or operator to have access to the automated dispenser, or any other means of approval or payment for use of the automated fluid dispenser. At 1008, if the request is declined, the rejection is sent to the mobile device. At 1010, if the request is approved, the network server sends an activation signal to the automated fluid dispenser. At 1012, the network server also sends confirmation that the request was approved to the mobile device.

Figure 11:
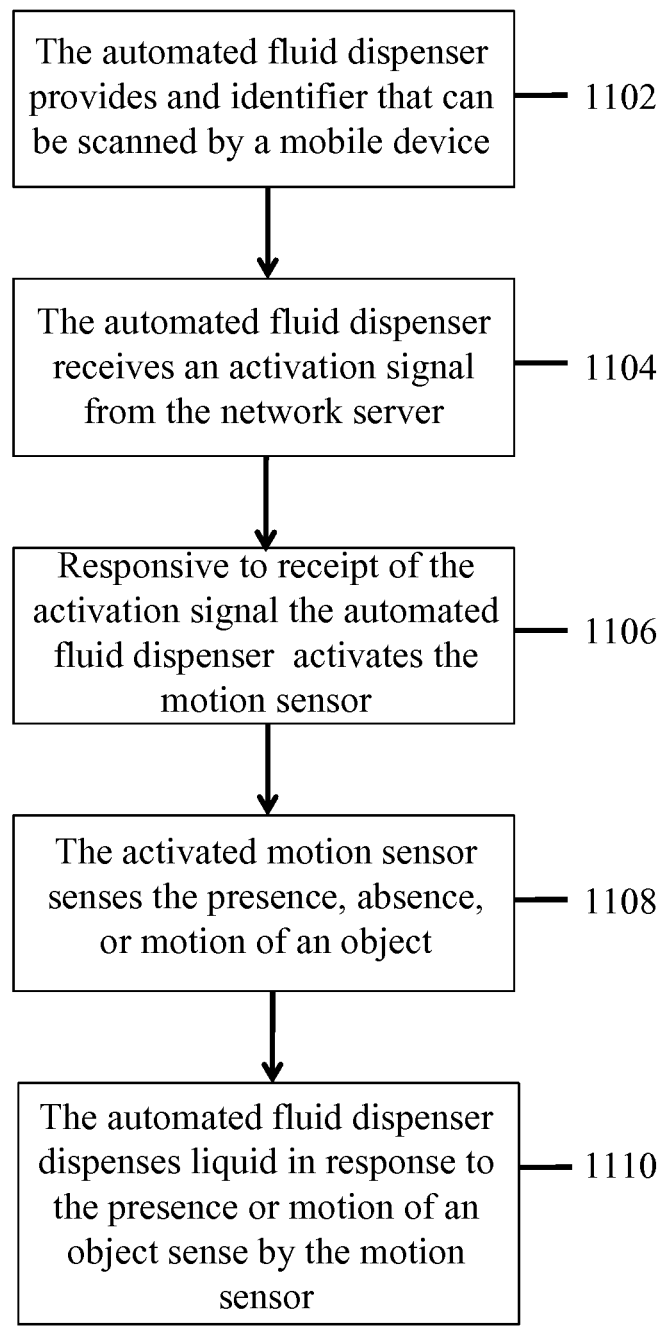
FIG. 11 is a diagram illustrating an exemplary method of operating an automated fluid dispenser.

FIG. 11 is a diagram illustrating an exemplary method of operating an automated fluid dispenser. At 1102, the automated fluid dispenser provides an identifier that can be scanned by a mobile device. After the mobile device sends the information generated from the identifier as illustrated in FIG. 9, and the request is approved by the network server, as illustrated in FIG. 10. At 1104, the automated fluid dispenser receives an activation signal from the network server. At 1106, responsive to the receipt of the activation signal the automated fluid dispenser activates the motion sensor. At 1108, the activated motion sensor senses the presence, absence, motion, or other property of an object. At 1110, the automated fluid dispenser dispenses fluid in response to the presence or motion of the object sensed by the motion sensor. In some examples, the method of operation comprises setting a fluid dispensing rate of the automated fluid dispenser 102 as a function of the presence or the motion of an object that is sensed by the motion sensor 108. The motion sensor may be configured such that the flow rate of the dispensing portion is a function of the speed of the motion detected, the distance of the detected object from the motion sensor, the angle at which the object is approaching or retreating from the sensor, or any other combination of motions that can be programmed into the sensor to indicate flow rate. For example, the fluid dispensing rate may be set as a function of the presence or motion of an object that is sensed by the motion sensor. Alternatively, the motion sensor may be programmed to dispense up to a predetermined amount of fluid, at either zero or a predetermined rate in response to sensing the presence or motion of an object in the sensing zone.

The examples set forth in FIGS. 9-11 represent a fluid dispenser. Other embodiments were contemplated, wherein the dispenser dispenses a product that is a solid.

Further, as used herein, the term "exemplary" is intended to mean "serving as an illustration or example of something."

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method for controlling dispensing of a product from an automated dispenser, executed at a mobile computing device, comprising:
    reading an identifier associated with the automated dispenser;
    responsive to reading the identifier associated with the automated dispenser, generating a request to activate the automated dispenser to dispense the product, the request comprising:
        identification data based on the identifier associated with the automated dispenser; and
        an identifier of the product; and
    transmitting the request to the automated dispenser based upon first user input to the mobile computing device, the request configured to trigger the automated dispenser to dispense the product in response to authorizing the request, wherein the automated dispenser authorizes the request without requiring user input to the mobile computing device additional to the first user input.

2. The method of claim 1, wherein authorizing the request comprises processing a payment for the product.

3. The method of claim 1, wherein authorizing the request comprises determining that a user of the mobile computing device has been approved to use the automated dispenser.

4. The method of claim 1, wherein authorizing the request comprises determining that a user of the mobile computing device has sufficient credits in an account to pay for the product.

5. The method of claim 1, wherein reading the identifier comprises scanning an optical code.

6. The method of claim 5, wherein the optical code is a QR code.

7. The method of claim 1, wherein reading the identifier comprises receiving the identifier via near-field-communication.

8. The method of claim 1, wherein the activation request is further configured to cause a motion sensor of the automated dispenser to initiate performance of sensing, and wherein the automated dispenser dispenses the product in response to the motion sensor detecting a presence of an object when performing the sensing.

9. A mobile computing device, comprising:
    a processor; and
    memory, the memory comprising instructions that, when executed by the processor, cause the processor to perform acts comprising:
        receiving an identifier, the identifier identifying an automated dispenser;
        responsive to receiving the identifier identifying the automated dispenser, creating an activation request to activate the automated dispenser to cause dispensing of a product, the activation request comprising identification data based on the identifier identifying the automated dispenser and an identifier of the product; and
        transmitting the activation request to the automated dispenser based upon first user input to the mobile computing device, the activation request configured to cause the automated dispenser to trigger dispensing of the product when the automated dispenser determines that the activation request is authorized, the automated dispenser determines that the activation request is authorized without requiring second user input to the mobile computing device additional to the first user input.

10. The mobile computing device of claim 9, wherein the activation request is further configured to cause a motion sensor of the automated dispenser to initiate performance of sensing, and wherein the automated dispenser dispenses the product in response to the motion sensor detecting a presence of an object when performing the sensing.

11. The mobile computing device of claim 9, the mobile computing device further comprising a display, the acts comprising displaying an indication that the request is not authorized on the display responsive to receiving data from the automated dispenser indicating that the request is not authorized.

12. The mobile computing device of claim 9, the mobile computing device further comprising a display, the acts further comprising displaying a confirmation of approval on the display responsive to receiving data from the automated dispenser indicating that the request is authorized.

13. The mobile computing device of claim 9, wherein determining that the activation request is authorized comprises determining that a user of the mobile computing device has sufficient credits in an account to pay for the product.

14. A method executed at a mobile computing device, the method comprising:
    scanning an identifier associated with an automated dispenser; and transmitting a request to the automated dispenser based upon first user input to the mobile computing device, the request comprising:
  identification data that identifies the automated dispenser, the identification data generated by the mobile computing device responsive to scanning the identifier; and
  an indication of a product to be dispensed by the automated dispenser;
wherein the request is configured to cause the automated dispenser to dispense the product, dispensing of the product triggered by the automated dispenser determining that the request is authorized, wherein the automated dispenser determines that the request is authorized without requiring second user input to the mobile computing device additional to the first user input.

15. The method of claim 14, wherein the request further comprises credentials of a user of the mobile computing device, the request configured to cause the automated dispenser to dispense the product responsive to the automated dispenser determining that the request is authorized based upon the user credentials.

16. The method of claim 14, wherein the request is further configured to cause a motion sensor of the automated dispenser to initiate performance of sensing, and wherein the automated dispenser dispenses the product in response to the motion sensor detecting a presence of an object when performing the sensing.

17. The method of claim 14, further comprising displaying an indication that the request is not authorized responsive to receiving data from the automated dispenser indicating that the request is not authorized.

18. The method of claim 14, further comprising displaying a confirmation of approval responsive to receiving data from the automated dispenser indicating that the request is authorized.

19. The method of claim 14, wherein scanning the identifier comprises scanning an optical code.

20. The computing system of claim 14, wherein determining that the request is authorized comprises processing a payment for the product.

\* \* \* \* \*